(No Model.)
C. T. MASON, Jr.
COTTON GIN.
No. 381,565. Patented Apr. 24, 1888.
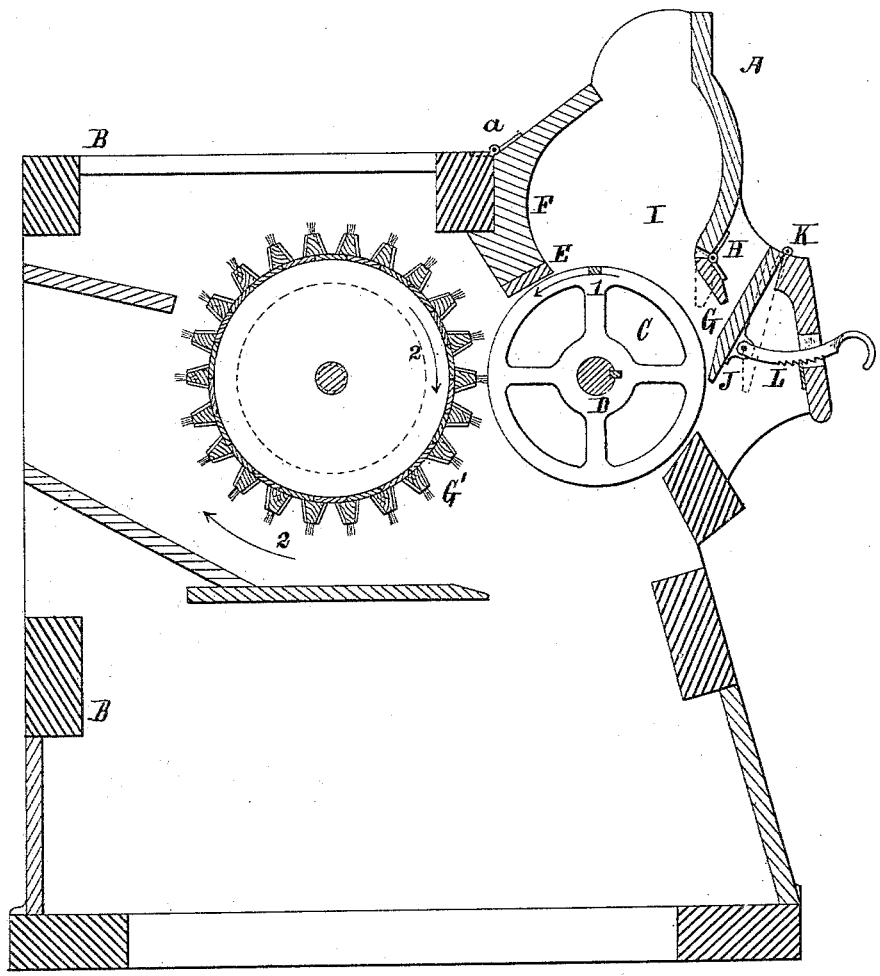
WITNESSES:
C. W. Benjamin
Edgar Goodwin
INVENTOR.
Charles T. Mason Jr
BY Park Benjamin
his ATTORNEY.

UNITED STATES PATENT OFFICE.

CHARLES T. MASON, JR., OF SUMTER, SOUTH CAROLINA.

COTTON-GIN.

SPECIFICATION forming part of Letters Patent No. 381,565, dated April 24, 1888.

Application filed June 30, 1887. Serial No. 242,943. (No model.)

*To all whom it may concern:*

Be it known that I, CHARLES T. MASON, Jr., of Sumter, Sumter county, South Carolina, have invented a new and useful Improvement in Cotton-Gins, of which the following is a specification.

My invention relates to improvements in the roll-box and breast of a cotton-gin, and more especially of gins of the cylinder type patented to me on the 21st day of April, 1885, Nos. 316,280, 316,378, and 316,379.

My invention consists in two or more adjustable seed-boards, the purpose of which is to regulate the flow of seed from the roll of cotton which is being ginned and to increase the capacity and effective working of the gin by promptly relieving the roll of the cleaned seed. In all gins, whether of the cylinder-type or containing the usual saws, at every turn of the ginning device a portion of the seed is cleaned. Upon the expeditious removal of this seed depends in large measure the capacity of the machine. In practice, in order to obtain sufficiently rapid removal of the cleaned seed, it is necessary to allow at the same time escape of some of the seed which is only partly cleaned, and this partly-cleaned seed must afterward again be subjected to the ginning operation.

In using two seed-boards the clean and partly-clean seed are allowed to escape freely from the roll-box past the first seed-board. On striking the lower seed-board the entirely-cleaned seed drops out, and the partly-cleaned seed, being brought into contact with the cylinder, is again acted upon and its lint removed. It will be apparent that in this way I obviate the necessity of returning the partly-cleaned seed to the roll-box. All the seed is cleaned during its continuous passage through the machine, and a free and ample delivery of seed from the roll-box is insured.

The accompanying drawing is a vertical section of a gin containing my invention.

A is the breast, hinged to the main frame B at *a*.

C is the ginning-cylinder, secured upon a shaft, D, and rotated by any suitable means in the direction of the arrow 1. This cylinder may be constructed in substantial accordance with any of the forms of cylinders set forth in my aforesaid Letters Patent.

E is a stripper-bar secured to the concave F.

G' is a brush-wheel for removing the lint from the cylinder C and revolving in the direction of the arrows 2.

G is the upper seed-board, hinged at H, and adjustable in position nearer to or farther from the periphery of cylinder C, as indicated by dotted lines, to regulate the flow of the seed from the roll-box I.

J is the lower seed-board, hinged at K. To the board J is attached a curved ratchet-bar, L, which extends through an opening in the breast and is provided with any suitable form of handle. The board J may be adjusted in any desired position, as indicated by dotted lines, and is held as disposed by means of the ratchet-bar L. The hinge H of the board G is made with a tight joint, so that the board will remain in any position in which it is placed. A ratchet-bar similar to that shown at L may be arranged in like manner, if desired, in connection with the board G.

In operation, the seed-cotton is fed into the roll-box I, and a roll is formed in the usual way. The lint is removed by the cylinder C, and the seed, cleaned and partly cleaned, escapes past the first seed-board G, which is adjusted to allow of a suitably-free flow, to insure best working capacity of the cylinder. The seeds then meet the lower board, J, which is adjusted so as to cause the partly-cleaned seed to be thoroughly cleaned by the cylinder before escape through the interval between cylinder and board.

I do not limit myself to two seed-boards, as here shown, as I may find it advantageous to use still another adjustable board, whereby the seeds may be brought for a third time into contact with the cylinder before they are finally let out of the machine.

It will be noticed that the stripper-bar is not placed perpendicularly above the axis of the cylinder, but considerably in rear of the same. I find this construction, in connection with the devices already described, to be especially advantageous, inasmuch as the weight of the roll is mainly thrown upon the cylinder, so that the teeth thereon obtain a more perfect hold upon the lint. The increase of lint thus removed results necessarily in a greater amount of seed being set free, and hence means for enabling the seed freely to leave the roll-box is indispensable; otherwise the advantages gained by the peculiar position of the stripper-bar might be reduced.

I claim—

1. In a cotton-gin containing a ginning mechanism and a roll-box, two adjustable seed-boards, one seed-board regulating the outflow of seed from the roll-box to the second seed-board, and said second seed-board regulating the escape of seed from the machine, substantially as described.

2. The combination of a ginning mechanism, a roll-box, an inclined seed-board at the lower portion thereof, and a second inclined seed-board arranged below said first-mentioned seed-board, substantially as described.

3. The combination of a rotary ginning-cylinder, a roll-box, an adjustable inclined seed-board at the lower portion thereof, and a second adjustable seed-board arranged below said first-mentioned seed-board, substantially as described.

4. The combination of the roll-box I, hinged seed-board G, hinged seed-board J, and ginning-cylinder, substantially as described.

5. The combination, with a ginning-cylinder, C, of the breast A, containing the stripper-bar E, roll-box I, adjustable seed-board G, and adjustable seed-board H, substantially as described.

6. The combination of a ginning-cylinder, a stripper-bar above said cylinder parallel to the axis of rotation, but eccentrically disposed with reference to said axis and in rear of a vertical plane passing through said axis, roll-box I, adjustable seed-board G, and adjustable seed-board H, substantially as described.

CHARLES T. MASON, JR.

Witnesses:
ELIJAH S. PIERCE,
E. M. ANDERSON.